US012614799B2

(12) United States Patent
Watanabe

(10) Patent No.: US 12,614,799 B2
(45) Date of Patent: Apr. 28, 2026

(54) WATERPROOF STRUCTURE FOR BATTERY PACK

(71) Applicant: TOYOTA JIDOSHA KABUSHIKI KAISHA, Toyota (JP)

(72) Inventor: Hirotaka Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 645 days.

(21) Appl. No.: 18/116,420

(22) Filed: Mar. 2, 2023

(65) Prior Publication Data

US 2023/0282917 A1 Sep. 7, 2023

(30) Foreign Application Priority Data

Mar. 4, 2022 (JP) ................................. 2022-033568

(51) Int. Cl.
| | |
|---|---|
| *H01M 50/24* | (2021.01) |
| *H01M 10/613* | (2014.01) |
| *H01M 10/6563* | (2014.01) |
| *H01M 50/271* | (2021.01) |
| *H01M 50/342* | (2021.01) |
| H01M 10/6561 | (2014.01) |

(52) U.S. Cl.
CPC ......... *H01M 50/24* (2021.01); *H01M 50/271* (2021.01); *H01M 50/342* (2021.01); *H01M 10/6561* (2015.04)

(58) Field of Classification Search
CPC .. H01M 50/24; H01M 50/342; H01M 50/271; H01M 10/6561
See application file for complete search history.

(56) References Cited

U.S. PATENT DOCUMENTS

2015/0207119 A1* 7/2015 Onodera ............. H01M 50/271
429/89

FOREIGN PATENT DOCUMENTS

| JP | 2014-160571 A | 9/2014 |
|---|---|---|
| JP | 2019-040700 A | 3/2019 |
| JP | 2020-035711 A | 3/2020 |
| JP | 7032269 B2 | 3/2022 |

OTHER PUBLICATIONS

JP2019040700A. Mar. 14, 2019. English machine translation by EPO. (Year: 2019).*

* cited by examiner

*Primary Examiner* — James Lee
(74) *Attorney, Agent, or Firm* — Dinsmore & Shohl LLP

(57) ABSTRACT

A waterproof structure for a battery pack includes: a waterproof tray on which a battery module included in a battery pack is placed; and a waterproof cover that covers the battery pack. The waterproof tray includes a bottom portion including an edge and housing the battery module, and a side wall portion extending from the edge. The waterproof cover includes an edge. The edge is located outside the side wall portion in a bottom view of the waterproof structure for the battery pack.

7 Claims, 9 Drawing Sheets

WATERPROOF STRUCTURE FOR BATTERY PACK

CROSS REFERENCE TO RELATED APPLICATIONS

This nonprovisional application claims priority to Japanese Patent Application No. 2022-033568 filed on Mar. 4, 2022 with the Japan Patent Office, the entire contents of which are hereby incorporated by reference.

BACKGROUND

Field

The present disclosure relates to a waterproof structure for a battery pack.

Description of the Background Art

There has been conventionally known a battery pack mounted on a vehicle. For example, as an example of such a battery pack, Japanese Patent Laying-Open No. 2020-35711 discloses a battery pack in which a plurality of battery modules are housed in a battery case including a case main body and a cover.

In the battery pack, a dome-shaped inner cover bulging convexly upward and including an open lower edge is put on the case main body to cover the battery modules from above, and the lower edge of the inner cover is located below output terminals of the battery modules. Specifically, in each of the battery modules, battery cells are stacked horizontally. The output terminals are provided on upper surfaces of the battery cells.

SUMMARY

When the waterproof structure including the inner cover disclosed in Japanese Patent Laying-Open No. 2020-35711 is applied to a battery module including vertically stacked battery cells, the following problem arises.

In the battery module including the vertically stacked battery cells, an output terminal of each battery cell is located on a side surface of the battery module. Therefore, when the battery module is exposed to water and the water accumulates on a bottom surface of the case main body, the output terminal of the lowermost battery cell is submerged in the water. In this case, the battery module is short-circuited.

The present disclosure provides a waterproof structure for a battery pack capable of preventing a bottom portion of a battery module from being exposed to water.

According to an aspect of the present disclosure, a waterproof structure for a battery pack includes: a waterproof tray on which a battery module included in a battery pack is placed; and a waterproof cover that covers the battery pack. The waterproof tray includes a bottom portion including a first edge and housing the battery module, and a side wall portion extending from the first edge. The waterproof cover includes a second edge. The second edge is located outside the side wall portion in a bottom view of the waterproof structure for the battery pack.

With such a configuration, even when the waterproof cover is exposed to water from above, the waterproof cover can prevent entry of the water into the waterproof tray.

Therefore, according to the waterproof structure, it is possible to prevent the bottom portion of the battery module from being exposed to water.

In some embodiments, the battery module includes a plurality of battery cells, each of the plurality of battery cells including an output terminal. The plurality of battery cells are stacked in a direction from the waterproof tray toward the waterproof cover.

With such a configuration, it is possible to prevent the output terminal of the lowermost battery cell, of the plurality of battery cells, from being exposed to water. Thus, a short circuit of the battery module can be prevented.

In some embodiments, the second edge includes a flashing portion extending downward in a side view of the waterproof structure for the battery pack.

With such a configuration, the flashing portion can guide downward the water that has reached the second edge of the waterproof cover. Therefore, inflow of the water from the second edge of the waterproof cover into the waterproof tray can be suppressed.

In some embodiments, a gap is formed between the second edge and the side wall portion. The gap serves as a discharge port of cooling air that cools the battery module.

With such a configuration, a path of the cooling air for the battery module can be ensured by the gap. In addition, since the cooling air is discharged through the gap, the cooling air can prevent inflow of the water from outside the waterproof structure into the waterproof tray.

The foregoing and other objects, features, aspects and advantages of the present disclosure will become more apparent from the following detailed description of the present disclosure when taken in conjunction with the accompanying drawings.

DETAILED DESCRIPTION

Figure 1:
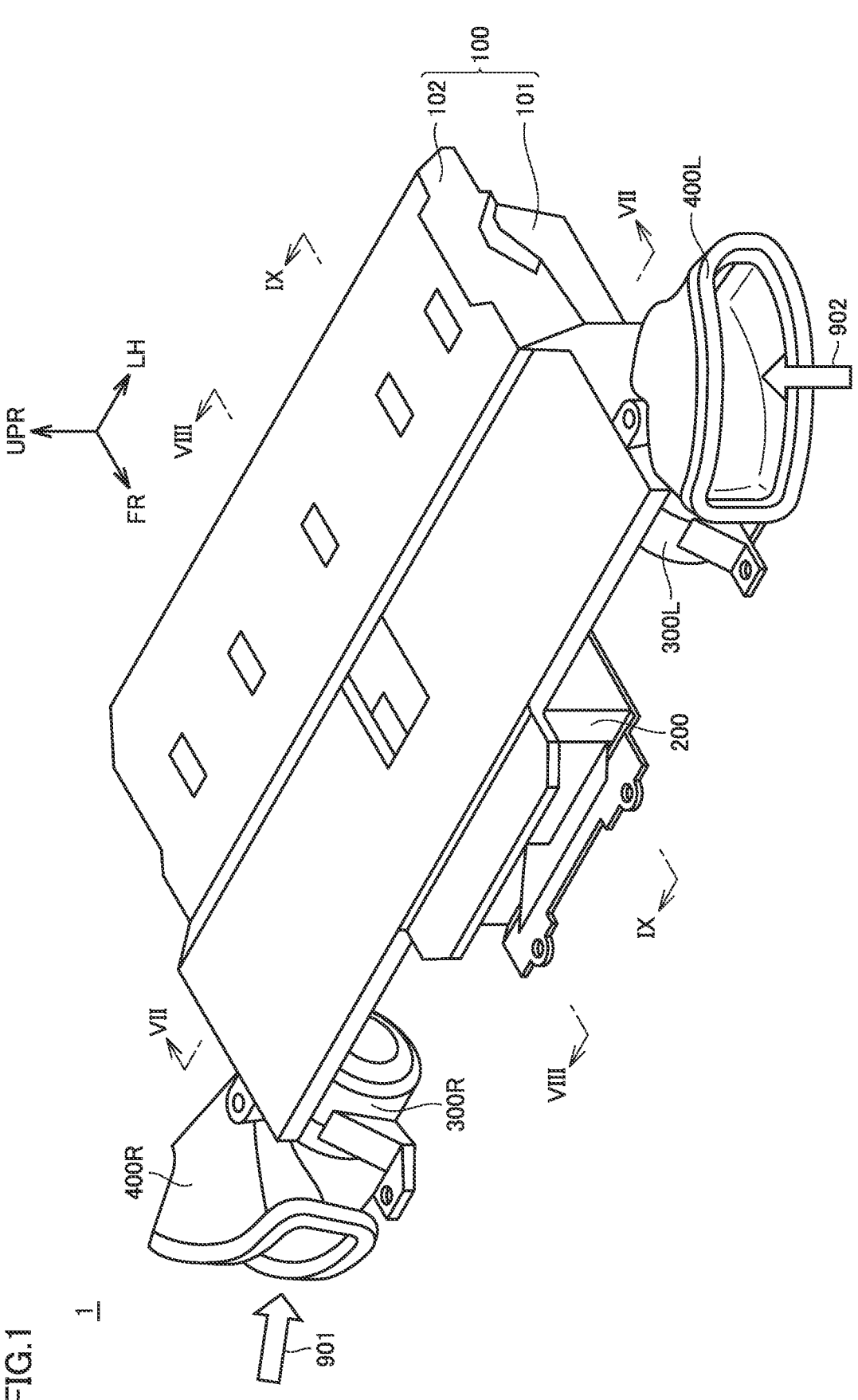
FIG. 1 is a perspective view of a device unit mounted on a vehicle.

An embodiment of the present disclosure will be described hereinafter with reference to the drawings. In the following description, the same components are denoted by the same reference characters. Their names and functions are also the same. Therefore, detailed description about them will not be repeated.

A battery according to the present embodiment is a secondary battery (storage battery). The battery is mounted on a vehicle such as a hybrid vehicle that can travel using motive power of at least one of a motor and an engine, or an electrically powered vehicle that travels using driving power obtained by electrical energy.

Figure 2:
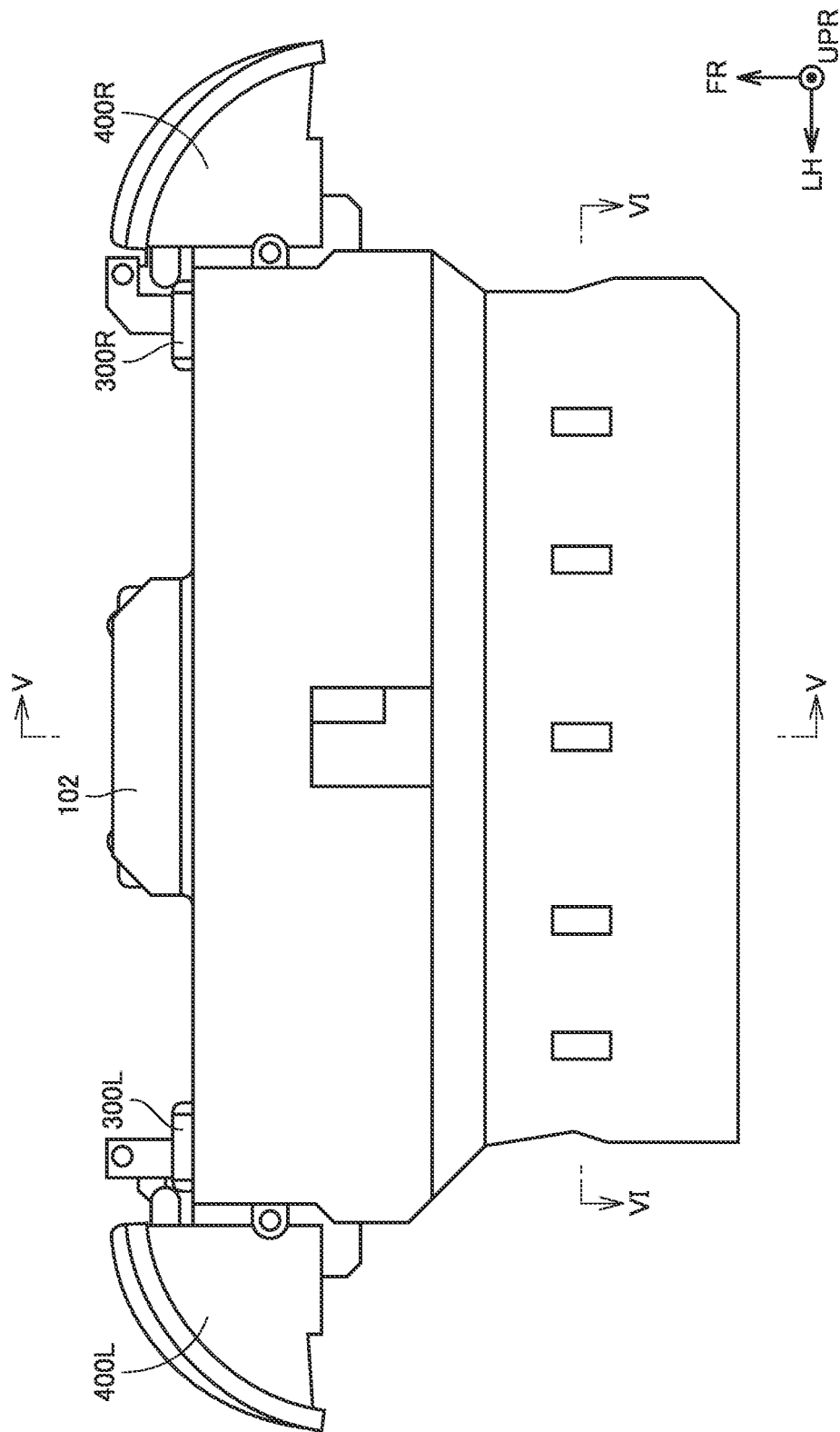
FIG. 2 is a top view of the device unit.
Figure 3:
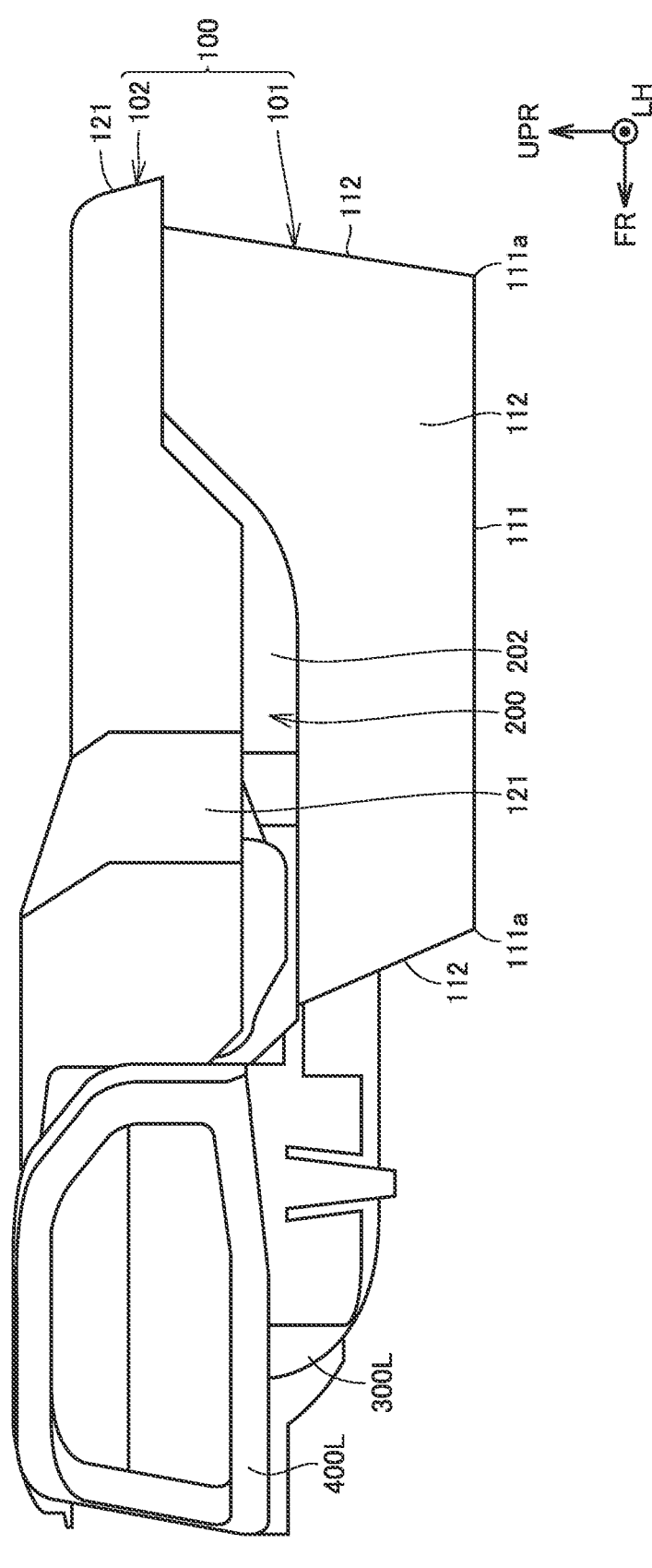
FIG. 3 is a side view of the device unit.
Figure 4:
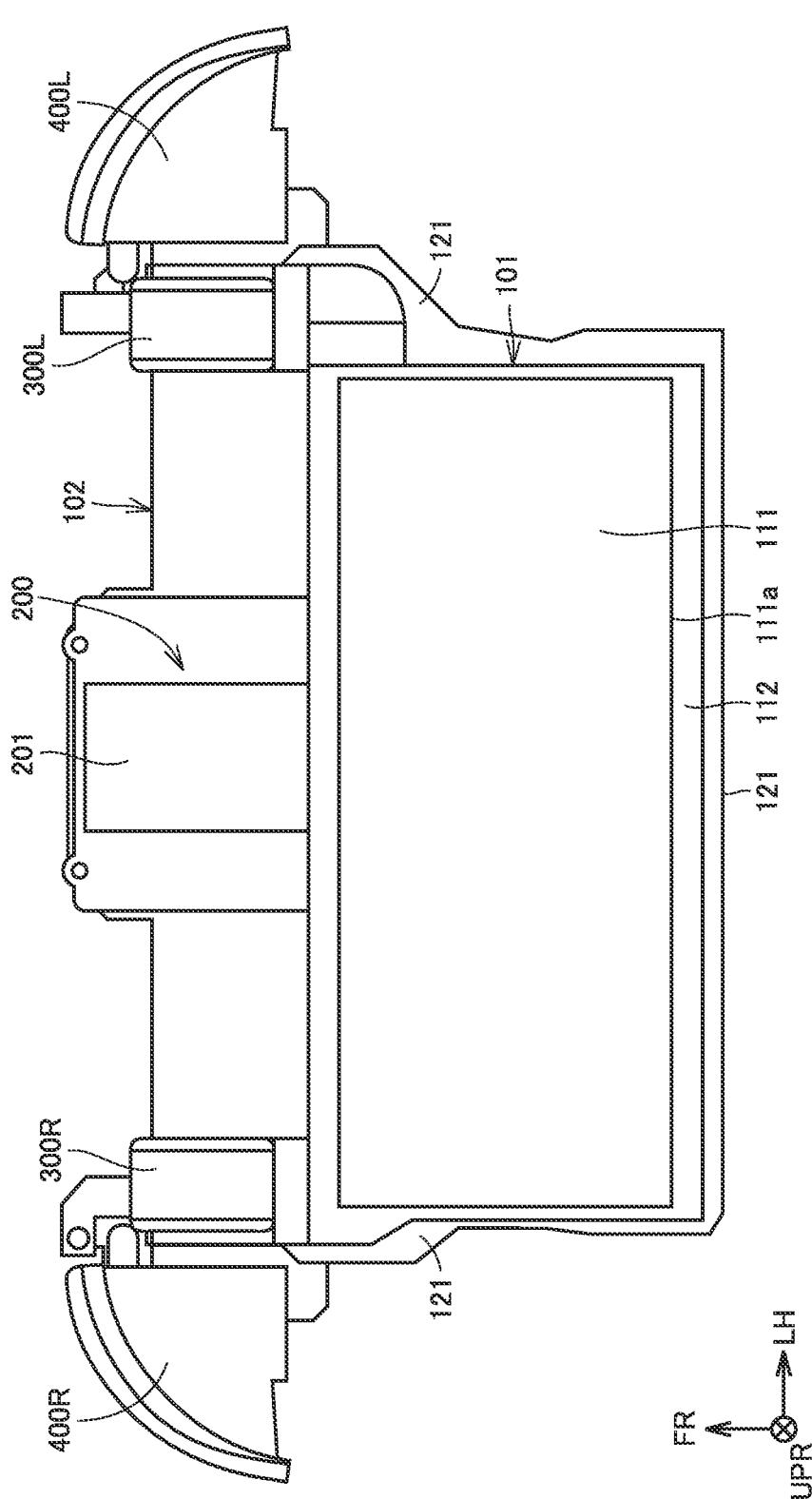
FIG. 4 is a bottom view of the device unit.

FIG. 1 is a perspective view of a device unit mounted on a vehicle. FIG. 2 is a top view of the device unit. FIG. 3 is a side view of the device unit. FIG. 4 is a bottom view of the device unit.

As shown in FIGS. 1 and 2, a device unit 1 includes a waterproof structure 100, a battery pack 200, blowers 300R and 300L, and air intake ducts 400R and 400L. Waterproof structure 100 includes a waterproof tray 101 and a waterproof cover 102. A direction indicated by an arrow UPR in FIGS. 1 and 2 represents a ceiling direction (upper direction) of the vehicle, a direction indicated by an arrow FR represents a front direction (traveling direction) of the vehicle, and a direction indicated by an arrow LH represents a left direction (left-hand side surface direction) of the vehicle.

When blower 300R is rotationally driven, air is taken from air intake duct 400R into device unit 1 as shown by an arrow 901. The air is supplied to battery pack 200 through a chamber. When blower 300L is rotationally driven, air is taken from air intake duct 400L into device unit 1 as shown by an arrow 902. The air is supplied to battery pack 200 through a chamber. Thus, battery pack 200 is cooled.

Waterproof cover 102 is located above waterproof tray 101. Waterproof cover 102 covers battery pack 200 and blowers 300R and 300L. Waterproof cover 102 bulges convexly upward and includes an open lower edge.

As shown in FIGS. 3 and 4, battery pack 200 is placed on waterproof tray 101. Specifically, battery pack 200 includes a high pressure device 201 and a battery module 202 (also referred to as "stack"). In the present embodiment, of high pressure device 201 and battery module 202, only battery module 202 is placed on waterproof tray 101.

In device unit 1, battery pack 200 (specifically, battery module 202) are sandwiched between waterproof tray 101 and waterproof cover 102 from an upward and downward direction. Waterproof cover 102 covers high pressure device 201 and battery module 202 from above, and waterproof tray 101 covers battery module 202 from below. Battery module 202 is fixed to waterproof tray 101 by a bolt or the like. Waterproof cover 102 is fixed to waterproof tray 101 by a bolt or the like.

Specifically, waterproof tray 101 includes a bottom portion 111 and a side wall portion 112. Bottom portion 111 includes an edge 111*a*. In the present embodiment, as shown in FIG. 4, bottom portion 111 has a rectangular shape. Therefore, edge 111*a* is an outer perimeter of the rectangular shape.

Side wall portion 112 extends from edge 111*a* of bottom portion 111. Side wall portion 112 extends upward from edge 111*a*. In the present embodiment, bottom portion 111 has a rectangular shape, and thus, waterproof tray 101 includes four side wall portions 112.

Waterproof cover 102 includes an edge 121. As shown in FIG. 4, edge 121 is located outside side wall portion 112 in a bottom view of device unit 1 (in other words, in a bottom view of waterproof structure 100). In the present embodiment, waterproof cover 102 is larger than waterproof tray 101 in a bottom view (or top view) of waterproof structure 100. In the bottom view (or top view), waterproof cover 102 overlaps with waterproof tray 101 and extends beyond the perimeter of waterproof tray 101.

As described above, waterproof tray 101 includes bottom portion 111 housing battery module 202, and side wall portion 112 extending from edge 111*a* of bottom portion 111. Edge 121 of waterproof cover 102 is located outside side wall portion 112 in a bottom view of waterproof structure 100.

Figure 5:
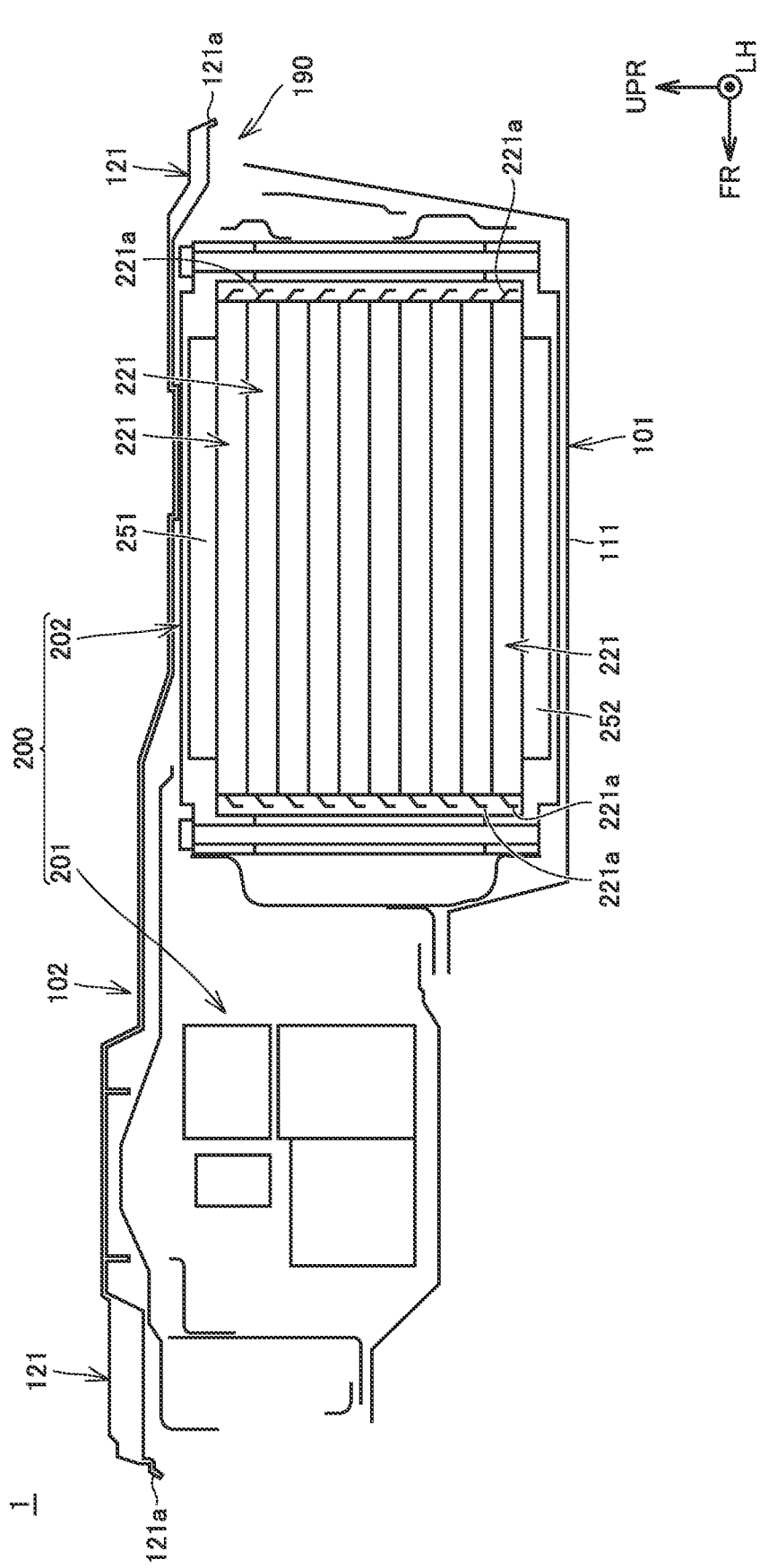
FIG. 5 is a cross-sectional view taken along the line V-V in FIG. 2.
Figure 6:
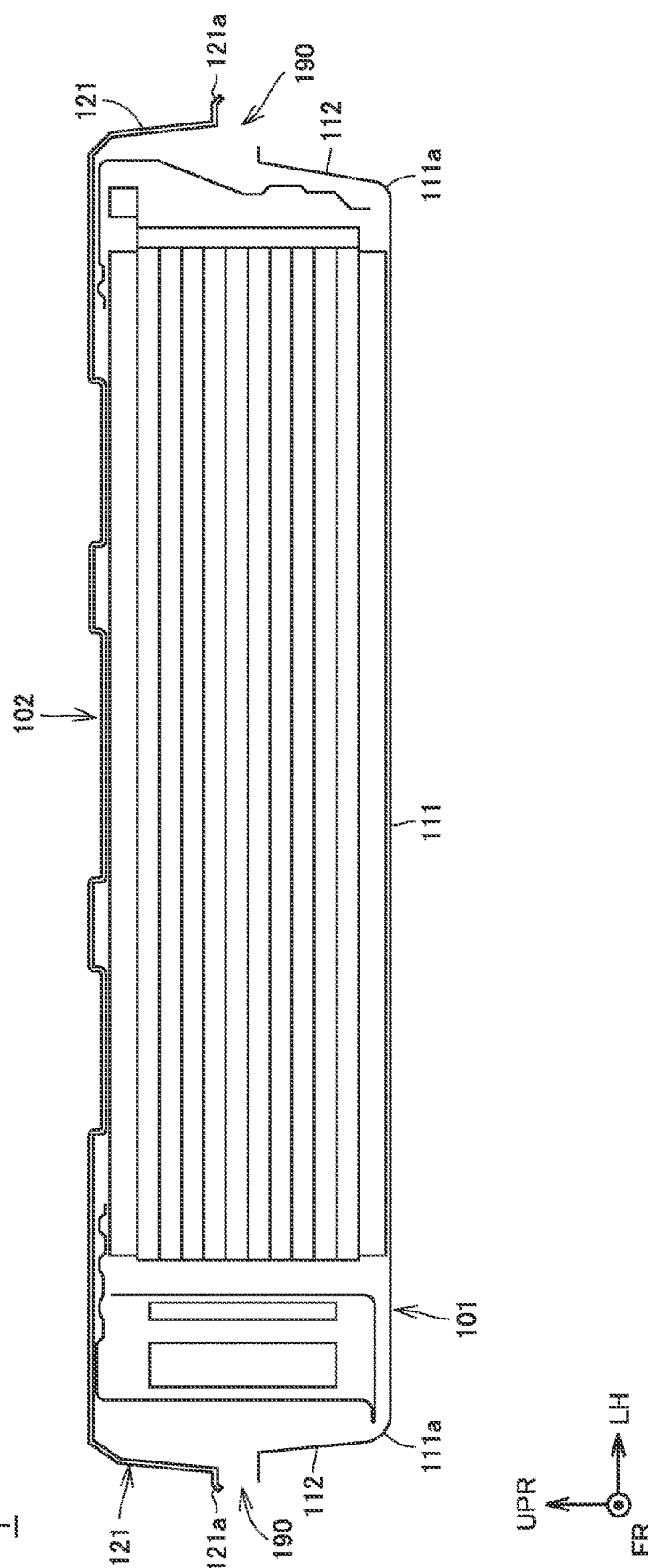
FIG. 6 is a cross-sectional view taken along the line VI-VI in FIG. 2.

FIG. 5 is a cross-sectional view taken along the line V-V in FIG. 2. FIG. 6 is a cross-sectional view taken along the line VI-VI in FIG. 2.

As shown in FIG. 5, battery pack 200 includes high pressure device 201 and battery module 202. High pressure device 201 is located on the front side (FR side) of battery module 202. As shown in FIGS. 5 and 6, waterproof cover 102 covers high pressure device 201 and battery module 202 from above. Battery module 202 is placed on waterproof tray 101. Specifically, battery module 202 is placed on bottom portion 111 of waterproof tray 101. Waterproof tray 101 covers battery module 202 from below.

As described above, waterproof cover 102 includes edge 121. In the present embodiment, edge 121 is the outer perimeter of waterproof cover 102. Edge 121 includes a flashing portion 121*a* extending downward in a side view of waterproof structure 100. The flashing portion is also referred to as "flashing structure".

Flashing portion 121*a* is implemented by an inclination (gradient) provided on a portion splashed with water. Flashing portion 121*a* is inclined diagonally downward. Specifically, flashing portion 121*a* extends in a direction in which flashing portion 121*a* becomes more distant from battery pack 200 along the downward direction. Flashing portion 121*a* may extend vertically downward.

Battery module 202 includes a plurality of battery cells 221. In battery module 202, battery cells 221 are stacked vertically upward from waterproof tray 101 toward waterproof cover 102. Each of battery cells 221 includes an output terminal 221*a*. Since battery cells 221 are stacked in the upward and downward direction, output terminals 221*a* are also aligned in the upward and downward direction.

Battery module 202 includes restraint plates 251 and 252 for restraining battery cells 221 in the upward and downward direction. Restraint plate 251 is located above battery cells 221, and restraint plate 252 is located below battery cells 221. Restraint plate 252 is in contact with bottom portion 111 of waterproof tray 101. Restraint plate 251 and restraint plate 252 also serve as a housing cover of battery module 202.

A gap 190 is formed between waterproof tray 101 and waterproof cover 102. Specifically, gap 190 is formed between side wall portion 112 of waterproof tray 101 and edge 121 of waterproof cover 102. Although described in detail below, gap 190 serves as a discharge port of cooling air that cools battery module 202.

Next, a flow of the air taken from air intake ducts 400R and 400L will be described.

Figure 7:
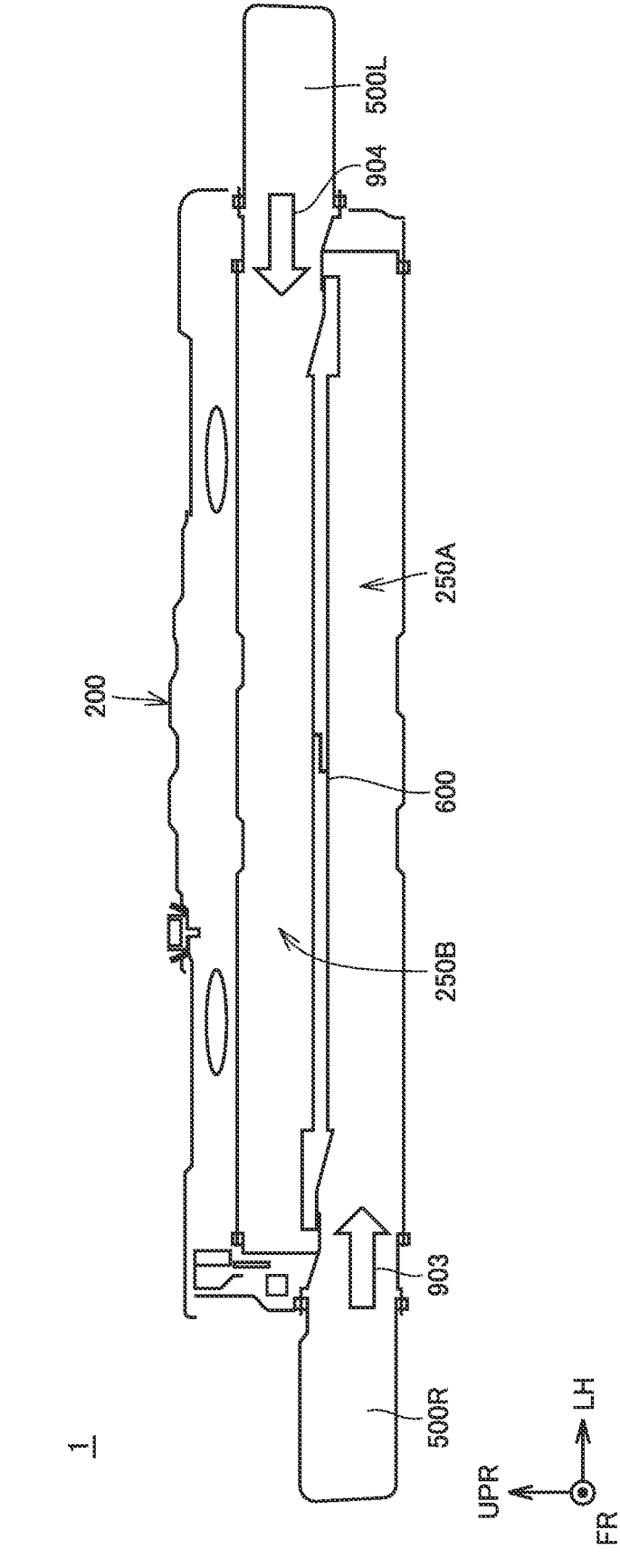
FIG. 7 is a cross-sectional view taken along the line VII-VII in FIG. 1.

FIG. 7 is a cross-sectional view taken along the line VII-VII in FIG. 1. For the sake of convenience, FIG. 7 does not show waterproof cover 102. As shown in FIG. 7, device unit 1 further includes air intake ports 500R and 500L, chambers 250A and 250B, and a separator 600.

One space is separated into two chambers 250A and 250B by separator 600. Air intake port 500R is continuous to chamber 250A. Air intake port 500L is continuous to chamber 250B.

The air taken from air intake duct 400R by blower 300R goes toward air intake port 500R. As shown by an arrow 903, the air is delivered from air intake port 500R to chamber 250A. The air delivered to chamber 250A goes toward battery module 202 sequentially.

Similarly, the air taken from air intake duct 400L by blower 300L goes toward air intake port 500L. As shown by an arrow 904, the air is delivered from air intake port 500L to chamber 250B. The air delivered to chamber 250B goes toward battery module 202 sequentially.

Figure 8:
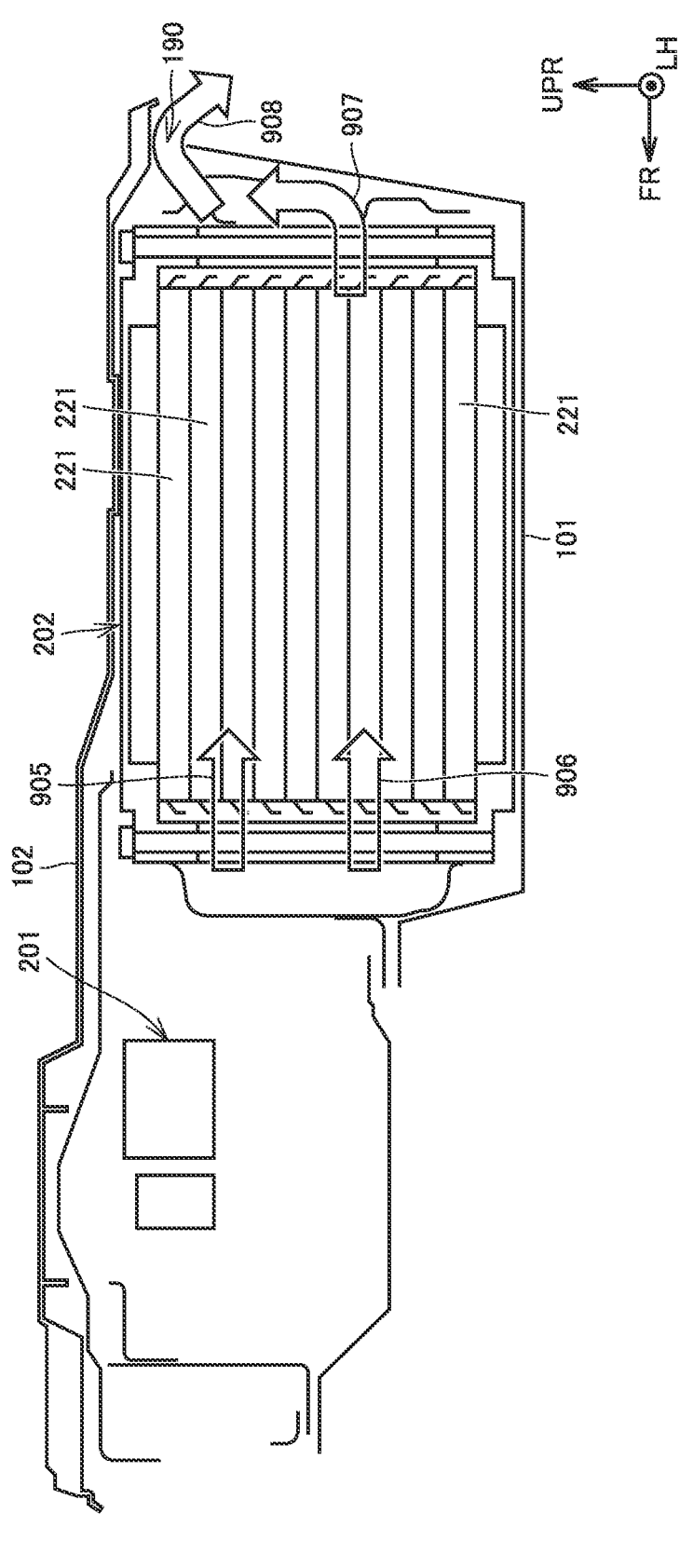
FIG. 8 is a cross-sectional view taken along the line VIII-VIII in FIG. 1.
Figure 9:
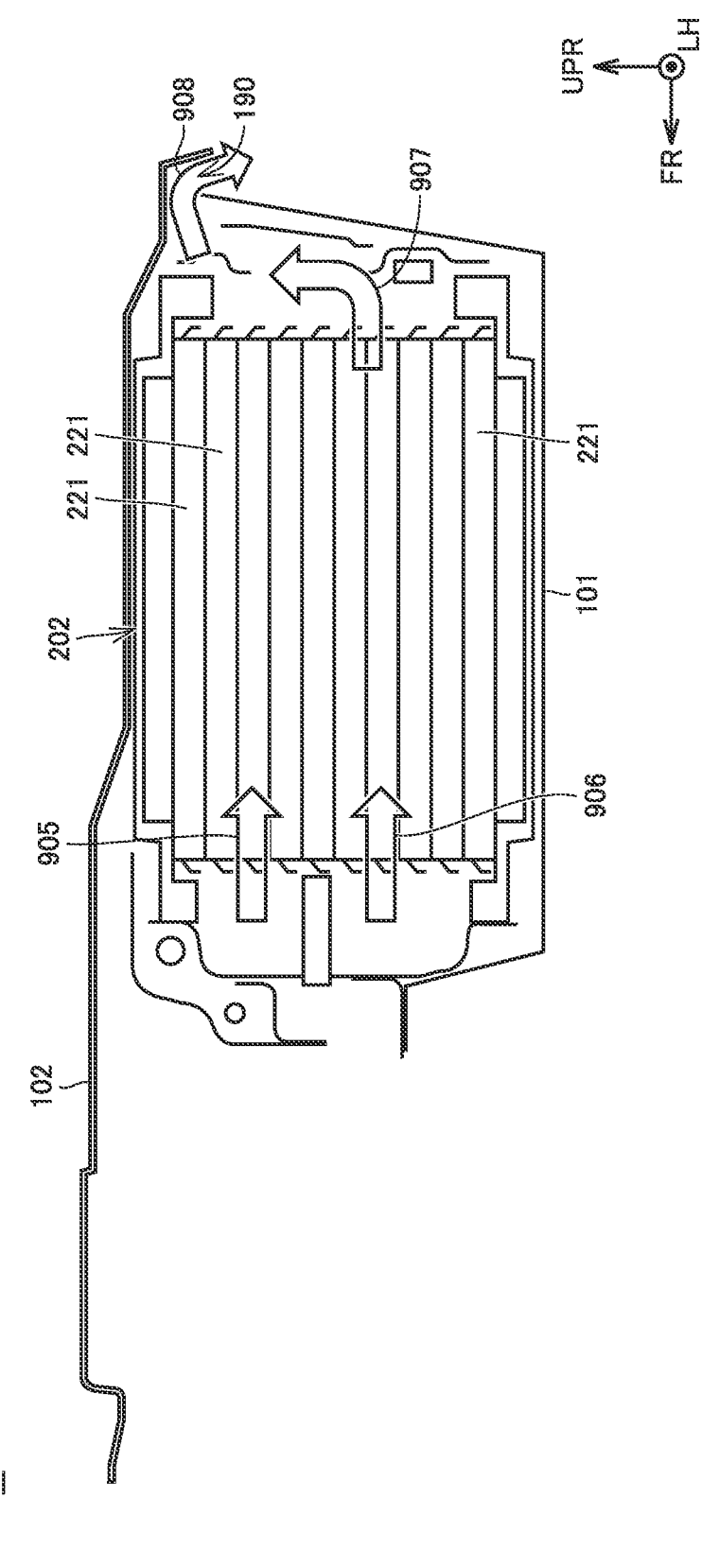
FIG. 9 is a cross-sectional view taken along the line IX-IX in FIG. 1.

FIG. 8 is a cross-sectional view taken along the line VIII-VIII in FIG. 1. FIG. 9 is a cross-sectional view taken along the line IX-IX in FIG. 1. The cross section in FIG. 8 and the cross section in FIG. 9 are spaced apart from each other by a predetermined distance (e.g., approximately 10 cm to 20 cm).

As shown in FIGS. 8 and 9, the air (air for cooling) from chambers 250A and 250B passes through battery module 202 as shown by arrows 905 and 906. Specifically, the air flows through a gap between adjacent battery cells 221 from the front side to the rear side. As shown by an arrow 907, the air that has passed through battery cells 221 goes toward gap 190. Then, the air is discharged through gap 190 to the outside of device unit 1, as shown by an arrow 908.

As described above, gap 190 is formed between edge 121 of waterproof cover 102 and side wall portion 112 of waterproof tray 101. Gap 190 serves as a discharge port of the cooling air that cools battery module 202. Thus, waterproof structure 100 has the function of discharging the air taken from air intake ducts 400R and 400L to the outside, in addition to the waterproof function for battery pack 200.

The features specific to waterproof structure 100 and the advantages provided by these features will be described below.

(1) As described above, waterproof structure 100 includes: waterproof tray 101 on which battery module 202 included in battery pack 200 is placed; and waterproof cover 102 that covers battery pack 200. Waterproof tray 101 includes bottom portion 111 including edge 111a and housing battery module 202, and side wall portion 112 extending from edge 111a. Waterproof cover 102 includes edge 121. Edge 121 is located outside side wall portion 112 in a bottom view of waterproof structure 100.

With such a configuration, even when waterproof cover 102 is exposed to water from above, waterproof cover 102 can prevent entry of the water into waterproof tray 101. Therefore, according to waterproof structure 100, it is possible to prevent the bottom portion of battery module 202 from being exposed to water.

Specifically, waterproof tray 101 is hidden by waterproof cover 102 in a top view of waterproof structure 100. Waterproof cover 102 is larger than waterproof tray 101 in a bottom view of waterproof structure 100. Therefore, according to waterproof structure 100, it is possible to prevent the bottom portion of battery module 202 from being exposed to water.

(2) Battery module 202 includes a plurality of battery cells 221, each of the plurality of battery cells 221 including output terminal 221a. The plurality of battery cells 221 are stacked in a direction from waterproof tray 101 toward waterproof cover 102.

As shown in FIGS. 5 and 6, when battery cells 221 are stacked in the direction from waterproof tray 101 toward waterproof cover 102 (vertically upward), battery cells 221 are aligned in this direction. That is, output terminal 221a of lowermost battery cell 221 is located near waterproof tray 101.

According to waterproof structure 100, even when battery modules 202 are stacked vertically, it is possible to prevent output terminal 221a of lowermost battery cell 221, of the plurality of battery cells 221, from being exposed to water. Thus, a short circuit of battery module 202 can be prevented.

(3) Edge 121 of waterproof cover 102 includes flashing portion 121a extending downward in a side view of waterproof structure 100.

With such a configuration, flashing portion 121a can guide downward the water that has reached edge 121 of waterproof cover 102. Therefore, inflow of the water from edge 121 of waterproof cover 102 into waterproof tray 101 can be suppressed.

(4) Gap 190 is formed between edge 121 of waterproof cover 102 and side wall portion 112 of waterproof tray 101. Gap 190 serves as a discharge port of cooling air that cools battery module 202.

With such a configuration, a path of the cooling air for battery module 202 can be ensured by gap 190. In addition, since the cooling air is discharged through gap 190, the cooling air can prevent inflow of the water from outside waterproof structure 100 into waterproof tray 101.

(5) Waterproof structure 100 is composed of waterproof tray 101 and waterproof cover 102. Therefore, according to waterproof structure 100, the number of components used to make battery pack 200 waterproof can be reduced.

(6) Waterproof cover 102 may be sized to cover at least battery pack 200, and waterproof tray 101 may be sized to house battery module 202. Therefore, waterproof structure 100 can be reduced in size.

Although the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A waterproof structure for a battery pack, comprising:
    a waterproof tray on which a battery module included in a battery pack is placed;
    a waterproof cover that covers the battery pack; and
    a blower configured to deliver cooling air toward the battery module, wherein
    the waterproof tray includes a bottom portion including a first edge and housing the battery module, and a side wall portion extending from the first edge,
    the waterproof cover includes a second edge,
    the second edge is located outside the side wall portion in a bottom view of the waterproof structure for the battery pack,
    a gap is formed between the second edge and the side wall portion, and the gap is configured to serve as a discharge port for the cooling air that cools the battery module.

2. The waterproof structure for the battery pack according to claim 1, wherein
    the battery module includes a plurality of battery cells, each of the plurality of battery cells including an output terminal, and
    the plurality of battery cells are stacked in a direction from the waterproof tray toward the waterproof cover.

3. The waterproof structure for the battery pack according to claim 1, wherein
    the second edge includes a flashing portion extending downward in a side view of the waterproof structure for the battery pack.

4. The waterproof structure for the battery pack according to claim 1, wherein the waterproof cover covers the blower.

5. The waterproof structure for the battery pack according to claim 1, wherein the second edge of the waterproof cover includes a flashing portion that extends diagonally downward in a direction in which the flashing portion becomes more distant from the battery pack.

6. The waterproof structure for the battery pack according to claim 5, wherein a first distal end of the side wall portion is below a second distal end of the flashing portion.

7. The waterproof structure for the battery pack according to claim 1, wherein the gap is configured such that the cooling air discharged through the gap prevents inflow of water from outside the waterproof structure into the waterproof tray.

* * * * *